W. J. CAMPBELL, Jr.
COMBINATION STRAINER.
APPLICATION FILED MAR. 1, 1920.
1,412,674.
Patented Apr. 11, 1922.
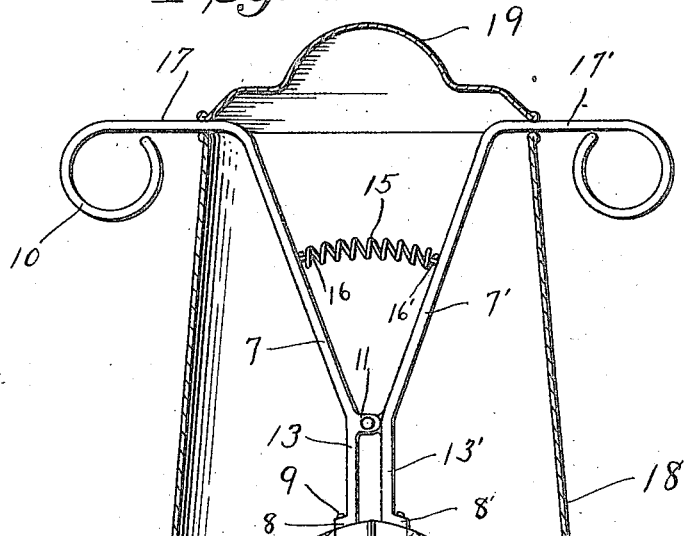
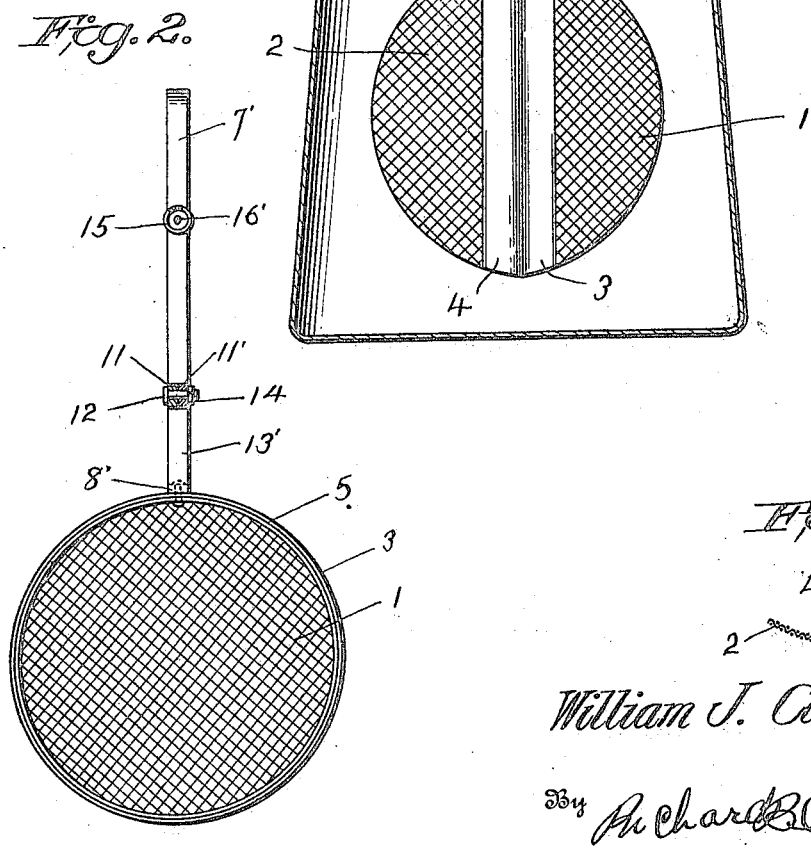
Inventor
William J. Campbell, Jr.,
By Richard B. Owen
Attorney

UNITED STATES PATENT OFFICE.

WILLIAM J. CAMPBELL, JR., OF ASTORIA, NEW YORK.

COMBINATION STRAINER.

1,412,674.   Specification of Letters Patent.   Patented Apr. 11, 1922.

Application filed March 1, 1920. Serial No. 362,184.

*To all whom it may concern:*

Be it known that I, WILLIAM J. CAMPBELL, Jr., a citizen of the United States, residing at Astoria, in the county of Queens and State of New York, have invented certain new and useful Improvements in Combination Strainers, of which the following is a specification.

This invention relates to strainers and particularly household strainers such as are usually employed for straining tea and coffee; the principal object of the invention being to provide an improved strainer means embodying novel features of construction and arrangement of parts which give to it a capacity for various uses not possessed by the ordinary household article.

A further object of the invention is to provide an article of the character above described in which a pair of strainer sections are pivoted together and so arranged that they may be brought together to form a single receptacle in which various articles may be deposited; each strainer section being provided with handle supporting means whereby it may be suspended within a coffee pot or other suitable utensil, according to the nature and purpose of the contents of the strainer.

With the above and other objects in view which will more fully appear as the description proceeds, the invention resides in the details of construction, combination and arrangement of parts as will be more fully explained reference being had to the accompanying drawings, in which Figure 1 is a vertical sectional view through a coffee pot, illustrating the application of the invention.

Figure 2 is a plan view of one of the strainer sections, and

Figure 3 is a detail showing the interfitting strainer sections.

In carrying out the purposes and objects of the invention as narrated above, household strainers 1 and 2 of the usual cup-shape type are employed and in the present instance provided with an upper reinforcing band or rim 3 and 4 respectively. Each band is of a substantial width, though narrow in cross section and the band 3 tapers along its marginal edge to form a tongue 5 which is adapted to fit snugly into the annular recess 6 formed in the outer edge of band 4, thus effecting a tight joint between the sections when they are brought together, as may be seen to advantage in Figure 3 of the drawing. Each strainer is provided with a handle which comprises, in the first instance, an elongated narrow bar 7 or 7' having an end portion bent outwardly into a foot 8 which rests against the reinforcing strainer band to which it is attached by fastening means 9; the opposite end of the bar being curved to provide a ring 10. At a slight distance above the foot 8, the bar is provided with an outwardly projecting ear piece or lugs 11 through which the pivot pin 12 is inserted. The handles 7 and 7' are attached to their respective strainers in the manner illustrated in Figure 1 of the drawing with the foot bearing portions 13 and 13' in closely spaced parallel relation to each other so that the lug 11 and 11' are disposed laterally of one another as shown in Figure 2, with the pin 12 passing through both of them and in threaded engagement with the nut 14. From this pivot 12, as a starting point, the handles 7 and 7' diverge outwardly from each other and between the diverging portions is arranged a coil spring 15, each end of which is looped about an inwardly directed stud 16 formed on the members 7 and 7', and between which the spring normally tends to expand. Each handle is, moreover, provided with a substantial portion 17 or 17' bent outwardly to project approximately in a horizontal plane therefrom; these substantial portions constituting hand grips for each individual strainer when used alone. These hand grips 17 and 17' it will be seen, terminate in the finger rings 10 and 10' by which these articles may be hung from a nail or other support.

In the application of the invention as a coffee strainer, the strainer sections 1 and 2 are spread apart by pressing handle 7 and 7' together compressing the spring 15, after which the coffee may be placed in one of the strainers which are then permitted to come together upon releasing the pressure of the spring 15. The strainer receptacle is then suspended within a coffee pot, as indicated at 18 in Figure 1 of the drawings, so that the contents of the strainer will be submerged in the boiling water and subject to the influences thereof, the hand grips 17 and 17' projecting over the edges of the pot and serving as supports for the strainer. Since the handles are practically flat bars, being of narrow cross section, it is also to be noted that the hand grips interfere, if at all, only to a slight and immaterial degree with the replacing of the coffee pot lid 19 while the strainer is disposed in the pot. The advantage of such a strainer means is thought to be self evident and it is obvious that by confining the coffee grounds within a removable container during the brewing of the coffee it is possible by simply withdrawing the container to drain the fluid and leave it free of any grounds, etc. In similar manner, the invention may be used in brewing tea or in making broth where only the flavor is wanted and it is desirable that the liquid be strained or free from the solid ingredients. In such instances, the strainer sections 1 and 2 may be brought together to provide the necessary receptacle for the vegetables, etc., and the spring normally tending to expand between the handles will exert sufficient pressure to hold the strainers together.

Each strainer is, moreover, adapted and intended for individual use and this may be accomplished merely by the unscrewing of nut 14 and withdrawing pivot pin 12, thus leaving the strainer free for use separately and independently. In such a capacity, each strainer may be put to any and all of the uses for which an ordinary household strainer is usually adapted. In its more simplified application therefore, the invention may be said to embody separate and individual strainers, pivoted or hinged together so as to jointly provide a straining receptacle wherein various articles may be temporarily enclosed for the purposes above stated, each strainer operating as a complement to the other strainer in the formation of the receptacle means.

Having thus described my invention, what I claim as new and desire to secure by Letters Patent is:—

1. In a combination strainer, a pair of oppositely disposed strainers having interfitting contact rims, parallel suspension members attached to and extending from the strainers for pivotal engagement with each other, a hand-hold provided on each member, and a yieldable spring connecting the members between the pivot and the handhold.

2. In a combination strainer, a pair of oppositely disposed strainers having complemental contact surfaces and parallel suspension means therefor including pivotally connected handles respectively secured at one end to a strainer and at the other end extended angularly to provide a handhold, and handle-tensioning means between the pivot and the handhold for retaining the strainers in relative contact to provide a straining enclosure.

3. In a device of the character described, a pair of handles, strainer elements at corresponding ends of the handle adapted to meet and form a straining receptacle, handholds at the opposite ends of the handles providing supporting means whereby the device may be suspended within a pot or other utensil, said handles being pivotally connected inwardly of the handhold and the strainers, and handle-tensioning means between the pivot and the handhold and normally tending to hold the strainers together.

4. A strainer receptacle, comprising a pair of separate strainers having their respective handles connected for pivotal movement and providing suspension means for hanging the receptacle within a pot or other utensil.

5. A strainer receptacle, comprising a pair of separate strainers having their handles pivotally connected together to provide for moving the strainers toward or away from each other, and end grips at the ends of these handles serving as supports for suspending the strainer within a pot or other utensil.

6. A device of the class described comprising complementary, strainer elements having reenforcing engaging bands effecting a tight joint between the elements, outwardly diverging pivoted handle elements secured at one end to the respective bands and extending laterally to provide a support for the strainer elements, the ends of said laterally extending portions terminating in finger engaging grips, resilient means connecting the respective handles between the pivoted connection and the finger grips, said handles being disposed in parallel relation with each other between the strainers and the pivotal connections.

In testimony whereof I affix my signature in presence of two witnesses.

WILLIAM J. CAMPBELL, Jr.

Witnesses:
JOHN WALTER UHL.
RAYMOND DURERA.